2,945,826

PREPARATION OF FOAMED RUBBER LATEX CONTAINING GELATINIZED STARCH

Lilian F. Everett, Biddenham, England, assignor to The Hairlok Company Limited, Bedford, England No Drawing. Filed Nov. 3, 1955, Ser. No. 544,831

Claims priority, application Great Britain Dec. 21, 1954

8 Claims. (Cl. 260—2.5)

This invention relates to the manufacture of sponge or foam rubber, both natural and synthetic all of which materials are included within the term "foam material" which will be used generally in the following description and claims. The invention is applicable to such materials which are used for many purposes, including especially, but not exclusively the manufacture of cushions, pillows and other forms of upholstery pads and the manufacture of upholstered furniture.

It is well-known that by suitably selecting the ingredients used and their relative proportions and by an appropriate control of the method of treatment, foam (including sponge) rubber can be produced having a specific volume or density and a resiliency which may vary over a wide range. For various reasons, including economic considerations, it is a great advantage if a pad having the required hardness or resistance to compression can be produced with a relatively low density, in order to keep to a minimum the amount of rubber required and to keep down the weight of the finished pad.

Experiments have shown that the hardness or resistance to compression of foam rubber and other foam materials is due partly to the inherent resiliency or stiffness of the material forming the cell walls and partly to the "pneumatic" effect which is produced by the air trapped within the cells. In fact, this latter effect is often the one which provides the greater part of the resistance to compression of the material.

This is shown by the fact that when a foam rubber pad is repeatedly compressed, or is maintained under compression for a substantial time, its power of recovery is considerably reduced and this power is only restored substantially completely if the material is allowed to remain uncompressed for a considerable period. This is apparently due to the time taken for the air, which was rapidly expelled from the cells under the action of a relatively high pressure, to re-enter the cells under the action of the much lower pressure difference produced by the resiliency of the cell walls when the load is removed.

From the above it will be seen that a pad having a relatively high resistance to compression can be produced by forming the foam material with a correspondingly high density, in order to restrict the size and porosity of the cells, but this involves the use of relatively large quantities of rubber. This is a disadvantage from the economic point of view and in cases in which it is desired to keep down the weight of the finished pad, for example for use in aircraft.

It is accordingly an object of the present invention to provide a method of producing a foam rubber material in which the porosity of the cells is reduced and the resistance to compression is increased, as compared with normal foam rubber material having a similar density.

According to the invention, a foam rubber material is produced by the method which comprises forming the material in cellular form having a natural cell size and porosity which is determined by the density and other properties of the material and thereafter producing a reduction in the porosity of the material by the action of a substance which is contained in or applied to the material of the cell walls.

According to one method of carrying out the invention a process is used which comprises forming a liquid mix containing a substance which is adapted to expand while within the cell walls after the formation of the latter, forming the mix into a foam, setting the foam to form a cellular mass without producing any substantial expansion of the said substance and thereafter causing the substance to expand within the cell walls to produce a reduction in the cell size and in the porosity of the resultant material.

As the said substance which is included in the mix it is preferred to use ungelatinized starch which is gelatinised by the application of heat after (but not before) the mix has been foamed and gelled so as to form a cellular mass.

It is known that starch can be formed into a fine-grained dispersion with water and, furthermore, that when such a dispersion is sufficiently heated the starch grains swell and burst, or gelatinise, with the production of a colloidal dispersion having particles which are so small that they can only be seen with an ultra-microscope. It has been discovered that these properties of starch, namely the swelling of the grains and the production of exceptionally fine particles thereof in the gelatinised dispersion, are very valuable when applied to the manufacture and treatment of sponge or foam rubber.

It is found that the use of starch in the above manner is remarkably effective in increasing the resistance to compression of the foam material which is produced, for a given density of the latter, providing that the gelling of the cellular rubber mass is effected before any substantial gelatinisation of the starch has taken place. Should the mix be heated so as to cause the starch to gelatinise before gelling of the rubber mass has taken place the remarkable and surprising benefits of the invention are not obtained to any useful extent.

While the expansion, i.e. the gelatinisation, of the starch must be caused to take place after the gelling of the sponge or foam rubber, it may be effected prior to or during the initial stages of the final setting, drying and/or vulcanisation of the rubber. If vulcanised latex is used the heating to produce gelatinisation of the starch may take place during the first stage of the drying operation.

Two methods of ctrrying out the invention will now be described in greater detail, by way of example.

According to one method a latex mix of any suitable composition is prepared containing a natural or synthetic latex, which may be vulcanised, unvulcanised or partly vulcanised, together with any necessary filler, such as zinc oxide, and any other ingredients which may be required, such as an anti-oxidant and a colouring agent. In the case of the use of an unvulcanised or partly vulcanised latex a vulcanising agent, such as sulphur, will be included, usually accompanied by a vulcanising accelerator.

There is also included in or added to this mix an ungelatinised dispersion of starch in water. The amount of the starch used is advantageously within the range of 1.0% to 8.0% of the total weight of the solid ingredients.

The liquid mix is foamed and the rubber material is then caused to gel in any suitable way, it being noted, however, that the gelling must be effected without the application of any heat sufficient to cause gelatinisation of the starch and the bursting of the starch grains. Should the starch gelatinise before the mix has gelled the advantages of the invention would be substantially lost. The gelling may be effected, for example, by freezing the liquid foam and by thereafter passing carbon dioxide gas through it, or by the inclusion in the mix of a delayed action setting agent such as sodium silico-fluoride.

By the above means a gelled cellular material is produced having a pre-determined mean cell size and porosity. This material is then subjected to a further treatment by means of which the size of the cells and the porosity of the material are simultaneously reduced. This is done by the application of heat to the material sufficient to raise the temperature of the starch and to cause the starch grains to swell and burst.

In the case of the use of unvulcanised or partly vulcanised latex, this heating may be produced as a preliminary to or during the initial stage of the vulcanising process, when the material is introduced into the vulcanising oven. If vulcanised latex is used the heating may take place during the first stage of the drying operation.

The expansion of the starch grains embedded in the cell walls is believed to expand the rubber forming the latter, thus restricting the size of the cells and of the intercommunicating pores, and thereby reducing the porosity of the material, without substantially increasing the density of the material as a whole. It has been found that in this way an increase in the hardness or resistance to compression of sponge rubber can be produced which is of the order of 30% for an initial starch content in the mix of 1% based on the weight of the dry rubber. The increase in hardness is approximately proportional to the starch content and may amount to as much as 150% for a starch content of 5%.

In a particular example of the above method, a mix is prepared having the following composition:

| | Parts by weight |
|---|---|
| Rubber from 60% centrifuged latex (unvulcanised) | 100.0 |
| Potassium oleate | 0.5 |
| Casein | 0.5 |
| Zinc oxide | 5.0 |
| Zinc diethyldithiocarbamate | 1.0 |
| Zinc mercaptobenzthiazole | 1.0 |
| Sym. dibetanaphthylparaphenylene diamine (Agerite White) | 1.0 |
| Sulphur | 2.25 |
| Paraffin oil | 4.0 |
| Maize starch (in aqueous dispersion) | 5.0 |

The concentration of the maize starch in the dispersion may be of the order of 35% by weight.

A pre-determined quantity of the above mix is foamed, poured into a mould and gelled. To do this the liquid foam is frozen in 20 minutes by means of a refrigerant at about minus 23° C. and gelling is effected by passing carbon dioxide gas through the frozen foam.

By this means a gelled cellular mass is produced having a pre-determined cell size and porosity. The mass is then heated for 20 minutes by means of a fluid (liquid or gas) at a temperature of 100° C. During the initial stages of this treatment the heat is sufficient to gelatinise the starch and to cause the starch grains to swell and burst. By this means the thickness of the cell walls is increased and the size and porosity of the intercommunicating pores of the cells are reduced or they are closed. During the last part of the treatment vulcanisation is completed.

Alternatively, gelling may be accomplished by the inclusion in the mix of a delayed action setting agent, such as sodium silico-fluoride. In this instance gelling of the rubber foam should take place either at room temperature or at any rate without the application of heat sufficient to burst the starch grains.

By the above means a foam cushion, for example, can be produced having an overall density (weight-volume ratio) of 54 grammes per litre and a hardness or stiffness of 22.5 kilogrammes for a 40% linear compression, as compared with a hardness of only 9 kilogrammes for a 40% compression obtained with a foam material of the same density produced without the inclusion of starch in the mix.

According to a further feature of this invention the two methods of treatment which have been described may be combined with a further treatment to increase the resistance to compression of the foam material.

For example, foam rubber cushions may be prepared as described from the mix specified containing maize starch. The material is washed and dried in the usual manner. Again for a density of 54 grammes per litre the foam rubber has a hardness for 40% compression of 22.5 kilogrammes, as compared with a hardness of only 9 kilogrammes which would have been obtained if no starch had been included in the mix. If this cushion is now passed through a bath containing a 0.5% solution of sodium alginate, mangled and dried, a hardness of about 56 kilogrammes for 40% compression is obtained with a weight gain of about 1%. In place of the sodium alginate, another suitable lyophylic colloid like casein or gelatinized starch can be used.

The invention is applicable to the treatment of vulcanised, unvulcanised or partly vulcanised latex made of natural or synthetic rubber, and it is to be understood that in the claims the term "rubber" is intended to include both the natural and synthetic rubbers.

I claim:

1. A method of producing a foam rubber which comprises providing a foamable and coagulable liquid mix containing rubber in suspension, adding to the mix from about 1 to 8% of a finely-divided ungelantinized starch based on the total weight of the solid ingredients, forming the mix into a foam, setting the foam to form a coagulated cellular mass at temperatures insufficient to cause the gelatinization of the starch, and thereafter heating the mass to a temperature sufficient to cause bursting of the starch grains and gelatinization of the starch.

2. A method as claimed in claim 1, wherein the starch is added to the mix in the form of an aqueous dispersion.

3. A method as claimed in claim 1, wherein the mix contains as its principal ingredient an at most only partly vulcanized rubber latex, and including the step of vulcanizing the rubber component after the gelatinization of the starch.

4. A method as claimed in claim 1, wherein the mix contains natural rubber latex as its principal ingredient.

5. A method as claimed in claim 1, wherein the mix contains a rubber latex, and after forming into a foamed cellular mass is gelled by freezing and by the action of carbon dioxide prior to the gelatinization of the starch.

6. A method as claimed in claim 1, wherein the mix is caused to gel after being formed into the cellular mass by the inclusion in the mix of a silico-fluoride delayed action setting agent.

7. A method as claimed in claim 1, wherein, following the gelatinization of the starch, the foam material is treated with a liquid dispersion of a lyophilic colloid of the group consisting of gelatinized starch, casein and alkali metal alginates in order to deposit the colloid on the cell walls and thereby produce a further reduction in the cell size and porosity of the foam material.

8. A method of producing a foam rubber having increased resistance to compression, which comprises providing a foamable and coagulable liquid mix containing rubber in suspension, adding to such mix an ungelatinized starch suspension in water in such amount that the weight of the starch is about 1.0% to 8.0% of the total weight of the solid ingredients, forming the mix into a foam, setting the foam to form a coagulated cellular rubber mass containing ungelatinized starch within the cellular walls thereof, and then effecting gelatinization of the starch with resulting expansion of the cellular walls and reduction in the size of the cellular spaces.

References Cited in the file of this patent

UNITED STATES PATENTS

| 2,693,006 | Shigekawa | Nov. 2, 1954 |
| 2,711,977 | Butsch | June 28, 1955 |

FOREIGN PATENTS

| 443,323 | Great Britain | Feb. 26, 1936 |